(12) United States Patent
Federowicz et al.

(10) Patent No.: US 9,038,568 B2
(45) Date of Patent: May 26, 2015

(54) EGG TRAY ADVANCEMENT SYSTEM FOR AN IN OVO INJECTION APPARATUS, AND ASSOCIATED METHOD

(71) Applicant: Zoetis LLC, New York, NY (US)

(72) Inventors: Joseph Federowicz, Apex, NC (US); Louis Pallay, Ste-Anne-de-Bellevue (CA)

(73) Assignee: Zoetis LLC, Florham Park, NJ (US)

( * ) Notice: Subject to any disclaimer, the term of this patent is extended or adjusted under 35 U.S.C. 154(b) by 266 days.

(21) Appl. No.: 13/834,688

(22) Filed: Mar. 15, 2013

(65) Prior Publication Data

US 2013/0239895 A1    Sep. 19, 2013

Related U.S. Application Data

(60) Provisional application No. 61/611,190, filed on Mar. 15, 2012.

(51) Int. Cl.
*A01K 45/00* (2006.01)
(52) U.S. Cl.
CPC ................................. *A01K 45/007* (2013.01)
(58) Field of Classification Search
CPC .................... A01K 45/007; A01K 45/00
USPC ................ 119/6.8, 50.7, 326, 327, 328, 651
See application file for complete search history.

(56) References Cited

U.S. PATENT DOCUMENTS

| | | | |
|---|---|---|---|
| 6,240,877 B1 * | 6/2001 | Bounds | 119/6.8 |
| 7,721,674 B2 * | 5/2010 | Smith | 119/6.8 |
| 2003/0056729 A1 | 3/2003 | Correa et al. | |
| 2009/0183685 A1 | 7/2009 | Correa et al. | |

OTHER PUBLICATIONS

PCT International Search Report with Written Opinion, International Application No. PCT/US2013/032108, Date of Mailing May 9, 2014.

* cited by examiner

*Primary Examiner* — Rob Swiatek
*Assistant Examiner* — Ebony Evans
(74) *Attorney, Agent, or Firm* — Barbara L. Renda; Scott C. Mayhew (57) ABSTRACT

An advancement system for an in ovo injection apparatus is provided. Such an advancement system is configured to advance an egg carrier carrying a plurality of avian eggs to an injection assembly. The advancement system includes a guide assembly configured to receive the egg carrier and provide support thereto during advancement of the egg carrier. A manual advancement device slidingly engages the guide assembly such that the manual advancement device is movable along the guide assembly. The manual advancement device is capable of interacting with a trailing end of the egg carrier to advance the egg carrier to an injection position. At least one stop is positioned to interact with the manual advancement device during advancement of the egg carrier so as to prevent progression of the manual advancement device beneath the injection assembly, thereby locating the egg carrier at the injection position. An associated method is also provided.

13 Claims, 7 Drawing Sheets

EGG TRAY ADVANCEMENT SYSTEM FOR AN IN OVO INJECTION APPARATUS, AND ASSOCIATED METHOD

CROSS REFERENCE TO RELATED APPLICATIONS

This application claims priority from U.S. Provisional Application No. 61/611,190, filed Mar. 15, 2012 which is incorporated by reference in its entirety.

TECHNICAL FIELD

The present disclosure generally relates to in ovo injection of avian eggs. More particularly, the present disclosure relates to an advancement system implemented on a manually operated in ovo injection apparatus, and an associated method.

BACKGROUND

Injections of various substances into avian eggs is commonly referred to as in ovo injection. Such injections have been employed to decrease post-hatch mortality rates, increase the potential growth rates or eventual size of the resulting bird, and even to influence the gender determination of the embryo. Similarly, injections of antigens into live eggs have been employed to incubate various substances used in vaccines which have human or animal medicinal or diagnostic applications. Examples of substances that have been used for, or proposed for, in ovo injection include vaccines, antibiotics and vitamins. In addition, removal of material from avian eggs has been employed for various purposes, such as testing and vaccine harvesting.

An egg injection apparatus (i.e., in ovo injection apparatus) may comprise a plurality of injection devices which operate simultaneously or sequentially to inject a plurality of eggs. The injection apparatus may comprise an injection head which comprises the injection devices, and wherein each injection device is in fluid communication with a source containing a treatment substance to be injected. In ovo injection of substances (as well as in ovo extraction of materials) typically occurs by piercing an egg shell to form an opening (e.g., via a punch), extending an injection needle through the hole and into the interior of the egg (and in some cases into the avian embryo contained therein), and injecting treatment substance(s) through the needle and/or removing material therefrom.

An in ovo injection apparatus conventionally is designed to operate in conjunction with commercial egg carriers or flats. Egg flats utilized in conjunction with an in ovo injection apparatus typically contain an array of pockets that are configured to support a respective plurality of avian eggs in a generally upright orientation. The eggs flats may be typically transported through the in ovo injection apparatus via an automated conveyor system having sensors and other automated control devices for registering the egg flat beneath the injection head for injection of the eggs carried by the egg flat. These control systems present an increased cost for manufacture of an automated in ovo injection apparatus capable of providing high throughput and reduced headcount for operation thereof.

However, in some instances, an automated in ovo injection apparatus may not be practical for use by a hatchery or otherwise in a pharmaceutical setting for manufacturing vaccines. Thus, in such instances, a manually operated in ovo injection apparatus without an automated conveyor system for transporting the egg flats through the in ovo injection apparatus may be suitable as an alternative to the automated in ovo injection apparatus. Without the automated conveyor system, however, a problem is posed in that alignment of the injection devices and the respective eggs is needed for consistent injection success. Requiring an operator to manually position the egg flat at a specific injection position to allow for alignment between the injection devices and the eggs may lead to errors such as, for example, misalignment of the needles and eggs, missing the eggs entirely (e.g., injecting at interstitial sites between adjacent eggs), and multiple injections of the same eggs. In addition, the operator may create a safety hazard by manually moving the egg flat beneath the injection devices in such a manner that one or more body parts are beneath the injection devices.

Accordingly, it would be desirable to provide an advancement system for use with an in ovo injection apparatus lacking an automated conveyor system for transporting eggs flats therethough, so as to ensure proper positioning of egg flats beneath an injection head, while also providing improved safety features and allowing for variations in egg flat size. Furthermore, it would be desirable to provide an associated method that would facilitate high throughput of in ovo injections implemented by an in ovo injection apparatus lacking an automated conveyor system for transporting eggs flats therethough, while reducing operator errors associated therewith.

BRIEF SUMMARY

The above and other needs are met by embodiments of the present disclosure which, according to one aspect, provides an in ovo injection apparatus capable of injecting a plurality of avian eggs carried by an egg carrier having a leading end and a trailing end. The apparatus comprises an injection assembly having a plurality of injection devices, each injection device being configured to inject a respective avian egg when aligned therewith. The apparatus further comprises an advancement system configured to advance an egg carrier carrying a plurality of avian eggs to the injection assembly for injection thereof. The advancement system includes a guide assembly configured to receive the egg carrier and provide support thereto during advancement of the egg carrier. A manual advancement device is configured to slidingly engage the guide assembly such that the manual advancement device is movable along the guide assembly. The manual advancement device is capable of interacting with the trailing end of the egg carrier to advance the egg carrier to an injection position. At least one stop is positioned to interact with the manual advancement device during advancement of the egg carrier along the guide assembly toward the injection assembly so as to prevent progression of the manual advancement device beneath the injection assembly, thereby locating the egg carrier at the injection position.

Another aspect provides a method of advancing an egg carrier through an in ovo injection apparatus for injection of a plurality of avian eggs carried by the egg carrier. The method comprises engaging an egg carrier with a guide assembly of an in ovo injection apparatus, the egg carrier having a leading end and a trailing end. The method further comprises abutting a manual advancement device against the trailing end of the egg carrier. The method further comprises advancing the manual advancement device along the guide assembly toward an injection assembly of the in ovo injection apparatus, thereby advancing the egg carrier along the guide assembly toward an injection position beneath the injection assembly. The method further comprises engaging the manual advancement device with a stop positioned along the guide assembly so as to prevent progression of the manual advancement device beneath the injection assembly, thereby locating the egg carrier at the injection position.

Thus, various aspects of the present disclosure provide advantages, as otherwise detailed herein.

BRIEF DESCRIPTION OF THE DRAWINGS

Having thus described various embodiments of the present disclosure in general terms, reference will now be made to the accompanying drawings, which are not necessarily drawn to scale, and wherein:

DETAILED DESCRIPTION OF THE DISCLOSURE

Various aspects of the present disclosure now will be described more fully hereinafter with reference to the accompanying drawings, in which some, but not all aspects of the disclosure are shown. Indeed, this disclosure may be embodied in many different forms and should not be construed as limited to the aspects set forth herein; rather, these aspects are provided so that this disclosure will satisfy applicable legal requirements. Like numbers refer to like elements throughout.

Figure 1:
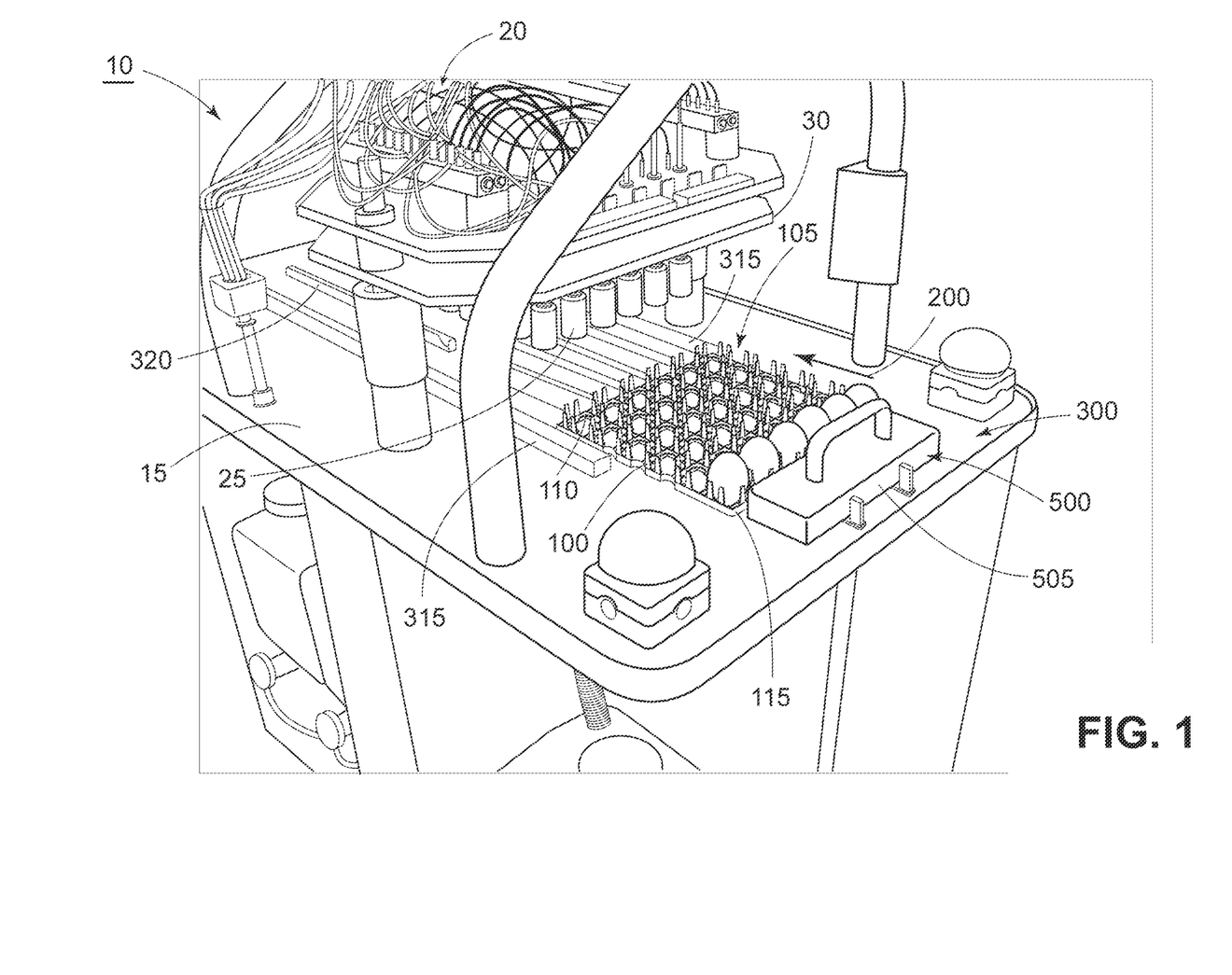
FIG. 1 is a perspective view of an in ovo injection apparatus with an advancement system for advancing an egg carrier carrying a plurality of avian eggs, according to one aspect of the present disclosure.
Figure 2:
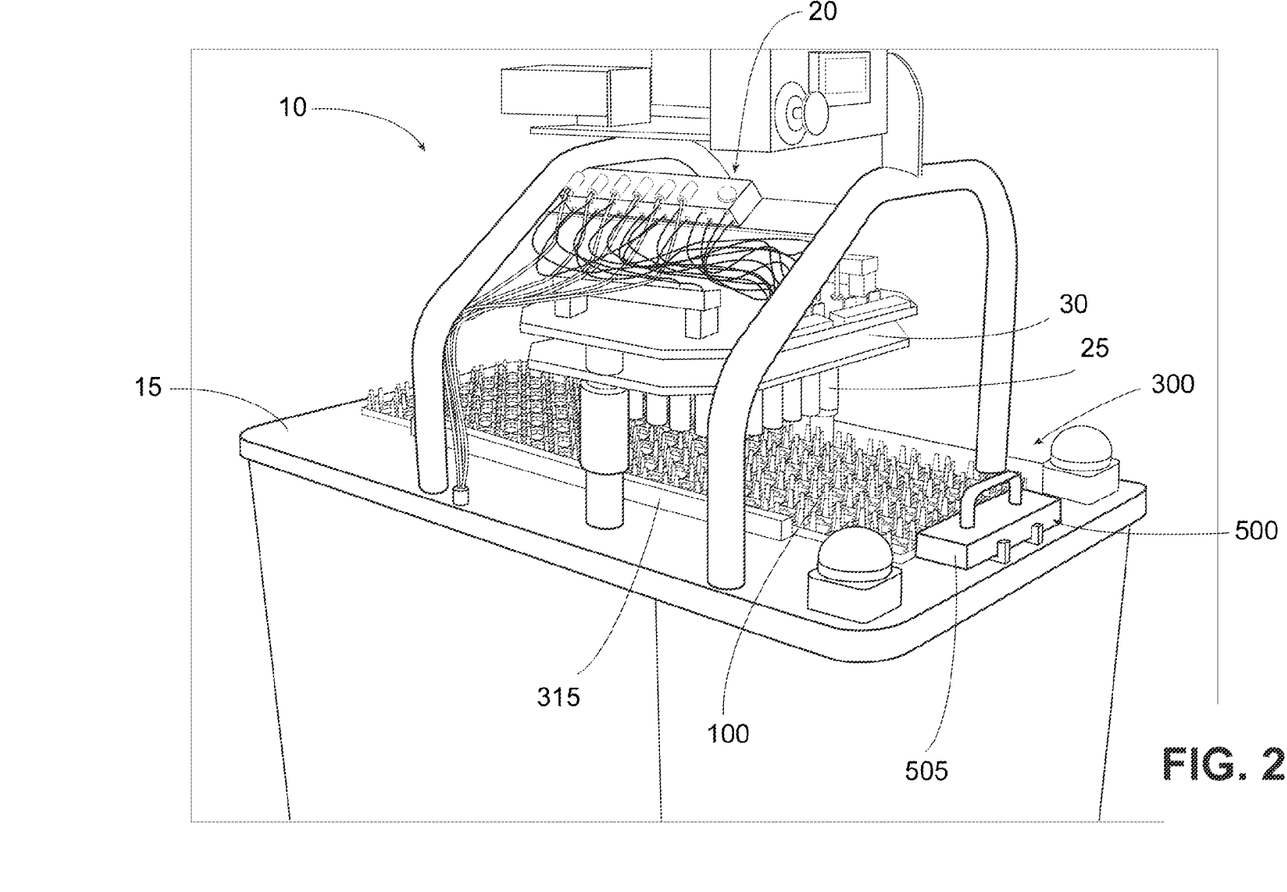
FIG. 2 is a perspective view of the in ovo injection apparatus shown in FIG. 1, with multiple egg carrier positioned in the advancement system.
Figure 3:
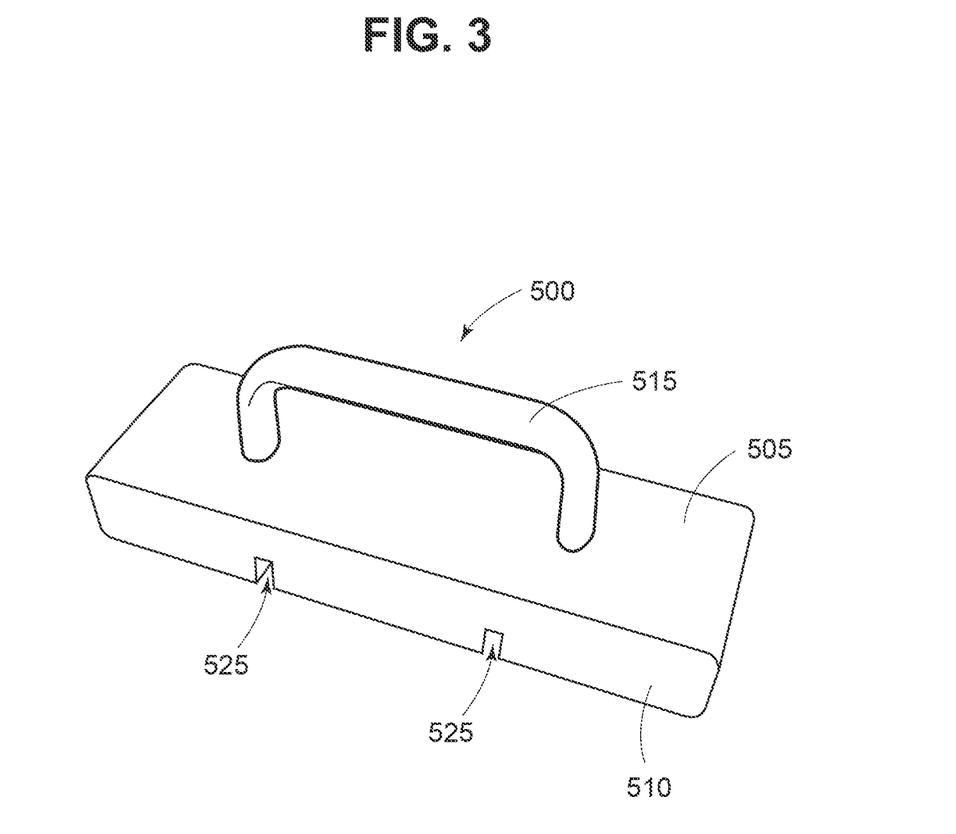
FIG. 3 is a perspective view of a manual advancement device for use with an advancement system for an in ovo injection apparatus, according to one aspect of the present disclosure.
Figure 4:
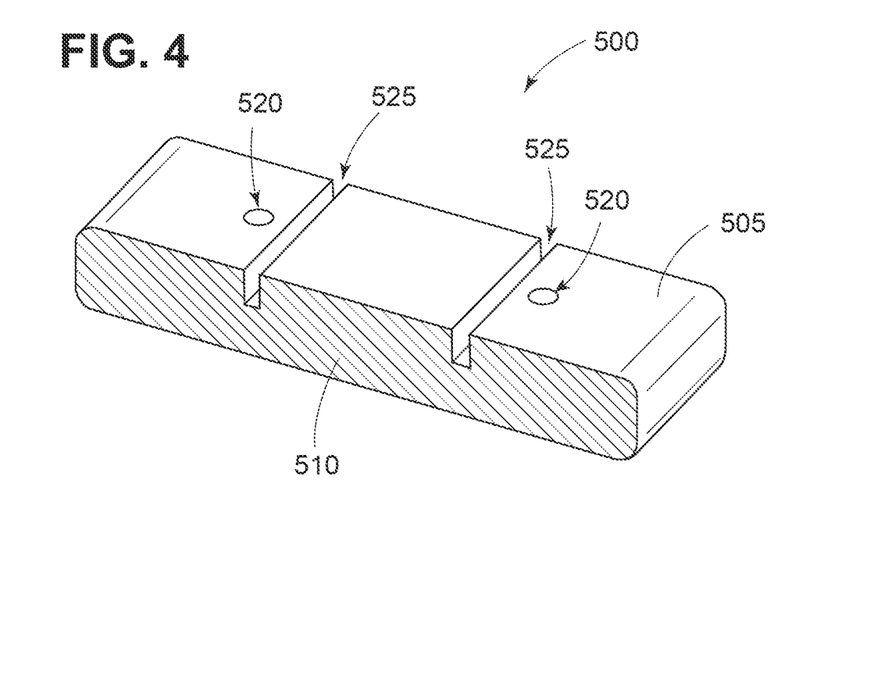
FIG. 4 is a schematic perspective view of a manual advancement device without a handle for use with an advancement system for an in ovo injection apparatus, according to one aspect of the present disclosure.
Figure 5:
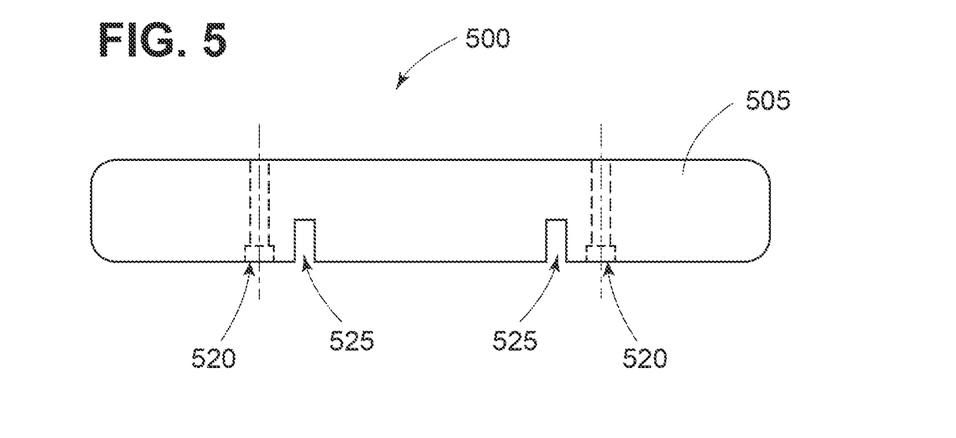
FIG. 5 is a schematic side view of the manual advancement device of FIG. 4.

An in ovo injection apparatus 10 is illustrated in FIGS. 1 and 2. The illustrated apparatus 10 includes a frame 15 and an injection assembly 20 movably attached thereto. The injection assembly 20 includes a plurality of injection devices 25 having needles associated therewith in accordance with known techniques for delivering a substance to avian eggs. The injection devices 25 may be arranged to form an injection head 30 capable of moving in a substantially vertical direction to inject avian eggs positioned therebeneath after being transported in a direction substantially perpendicular to the vertical direction of travel of the injection head 30. The illustrated injection head 30 includes thirty-six (36) injection devices 25 (one of skill in the art will recognize that the present disclosure is not limited to a specific quantity of injection devices). In ovo injection of substances (as well as in ovo extraction of materials) typically occurs by piercing an egg shell to form an opening (e.g., via a punch), extending an injection needle through the hole and into the interior of the egg (and in some cases into the avian embryo contained therein), and injecting treatment substance(s) through the needle and/or removing material therefrom. As previously mentioned, however, injection errors may occur when locating of an egg flat beneath the injection assembly 20 is performed manually by an operator. That is, errors such as misalignment of the needles and eggs, missing the eggs entirely (e.g., injecting at interstitial sites between adjacent eggs), and multiple injections of the same eggs can occur.

The apparatus 10 may be configured to receive an egg carrier (e.g., an egg flat) 100 that supports avian eggs for transport. The illustrated egg carrier 100 is configured to hold a plurality of avian eggs in a substantially upright position so as to provide external access to predetermined areas of the eggs. Specifically, each egg can be contacted by the injection devices 25 from above the egg carrier 100. Each egg is held by the egg carrier 100 so that a respective end thereof is in proper alignment relative to a corresponding one of the injection devices 25. The egg carrier 100 may include an array of receptacles 105 configured to support a respective plurality of eggs in a generally upright orientation, as shown in FIG. 1. The illustrated egg carrier 100 includes a plurality of rows of receptacles 105. Each receptacle 105 may be configured to receive one end of a respective egg so as to support the egg in a substantially vertical position. The illustrated egg carrier 100 is capable of carrying thirty-six (36) eggs (one of skill in the art will recognize that the present disclosure is capable of handling various quantities of eggs as dependent upon the size of the egg carrier 100). The egg carrier 100 may include a leading end 110, a trailing end 115, and a pair of sides cooperating to form a generally rectangular structure. However, the egg carrier 100 may have any size, shape or dimensions and modifications of the present disclosure may be configured to accommodate such variations. The leading end 110 of the egg carrier 100 is the portion thereof that first moves beneath the injection head 30 with respect to the trailing end 115 when the egg carrier advances in a first direction 200. The trailing end is the last portion of the egg carrier 100 to pass beneath the injection head 30 when the egg carrier 100 is advanced in the first direction 200.

The present disclosure provides an advancement system 300 capable of reducing operator errors associated with manually advancing the egg carrier 100 through the apparatus 10 for locating the egg carrier 100 at an appropriate injection position (eggs properly aligned with a respective injection device 25) by ensuring consistently proper advancement and positioning of the egg carrier 100 beneath the injection head 30 for the egg carriers 100. In other words, the advancement system 300 may be configured to locate the egg carrier 100 and subsequent egg carriers 100 at the injection position during advancement thereof through the apparatus 10.

The advancement system 300 may include a guide assembly fixed, connected, or attached to (or otherwise operably engaged with) the frame 15. The guide assembly may be configured to receive and constrain the egg carrier 100 therewithin such that the egg carrier 100 may be manually slid by an operator along the guide assembly through the apparatus 10. A carrier slide path 310 may be defined by the guide assembly, wherein the egg carrier 100 moves along the carrier slide path 310 from a loading position to the injection position. According to one aspect, the guide assembly may include a pair of side rails 315 for laterally constraining the egg carrier 100 and a plurality of support rails 320 for supporting a bottom of the egg carrier 100 and limiting the twisting action of the egg carrier 100 within the carrier slide path 310, as shown in FIGS. 1, 2, 6 and 7. Each side rail 315 may include a lip 370 on which the bottom portion of the egg carrier 100 sits when positioned within the guide assembly. That is, the sides of the eggs carrier 100 may engage the lips 370 so as to provide a sliding contact portion.

Figure 8:
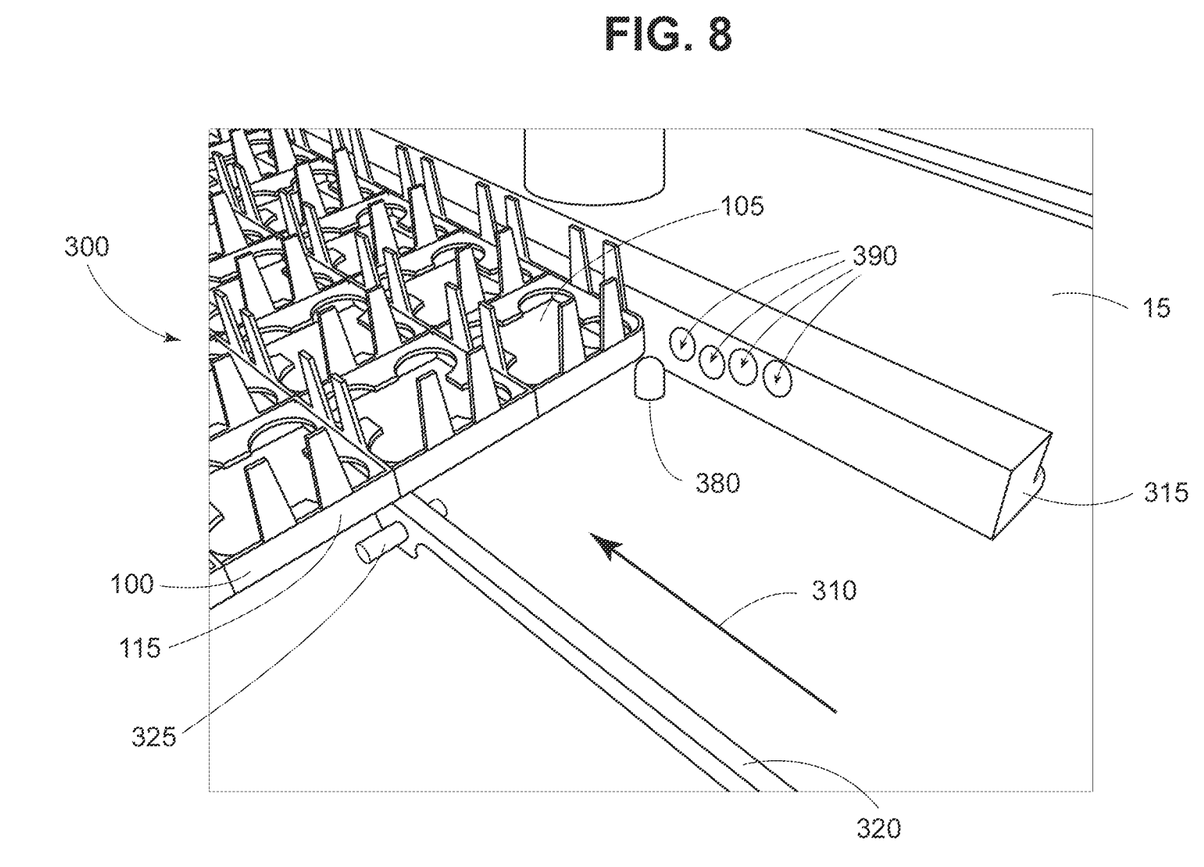
FIG. 8 is a perspective view of a guide assembly of an advancement system for an in ovo injection apparatus, according to one aspect of the present disclosure.

In order to account for egg carriers 100 of varying size (and particularly with respect to width), the side rails 315 may be movable with respect to one another such that the parallel spacing therebetween may be increased or decreased. Thus, the advancement system 300 may adapt to various sized egg carriers 100. According to one aspect, as shown in FIG. 8, the guide assembly may include one or more studs, posts, or projections 380 for engaging the side rails 315 in a fixed position. The projections 380 may be received within one of a plurality of cavities 390 defined by the side rails to provide various positioning of the side rails 315 for defining the guide assembly. The cavities 390 may be defined at various positions along the width of the side rails 315 such that each cavity 390 creates a different position for the side rails 315. One of skill in the art will recognize that the stud, posts, or projections 380 may instead be formed on the side rails 315 and the cavities 390 or otherwise apertures may be defined by a portion of the guide assembly or frame 15 in order to accomplish the adjustable positioning scheme for the side rails 315.

As shown in FIGS. 1-7, the advancement system 300 may include a manual advancement device 500 provided to advance the egg carrier 100 along the guide assembly to the injection assembly 20. In some instances, the manual advancement device 500 may be removable with respect to the guide assembly. The manual advancement device 500 may be used to advance the egg carrier 100 from the loading position to the injection position. In this regard, the manual advancement device 500 may be received within the guide assembly so as to abut or otherwise interact with the egg carrier 100, wherein movement of the manual advancement device 500 along the carrier slide path 310 causes the egg carrier 100 to also move along the carrier slide path 310 toward the injection position.

According to some aspects of the present disclosure, the manual advancement device 500 may be a pusher block 505 having a substantially cuboid shape. The pusher block 505 may have a face wall 510 configured to abut the egg carrier 100. According to some aspects, the pusher block may have a handle 515 for the operator to grasp while moving the manual advancement device 500 along the guide assembly for positioning of the egg carrier 100 in the loading position and the injection position. In this regard, the pusher block 505 may define one or more boreholes 520 for receiving the handle 515, although the handle 515 may be integrally formed with the pusher block 505 in some instances. The pusher block 505 may be constructed of any suitable material. According to one aspect, the pusher block 505 may be comprised of ultra high molecular weight (UHMW) polyethylene. In some instances, the manual advancement device 500 may include a hook for hooking and removing the egg carrier 100 from beneath the injection assembly 20 after injection of the eggs carried thereby.

According to some aspects, the manual advancement device 500 may slidably engage the support rails 320 of the guide assembly. For example, the pusher block 505 may define one or more channels 525 configured to mate with the support rails 320 such that the pusher block 505 may slide therealong. The channels 525 may be shaped to correspondingly mate with the shape of the support rails 320 to provide support to the pusher block 505 as it moves along the carrier slide path 310. In some aspects, the channels 525 may be substantially rectangular in shape.

In order to provide consistent location of the egg carrier 100 beneath the injection assembly 20, a stop 325 may be provided as part of the guide assembly. The stop 325 may be positioned along the guide assembly so as to prevent the manual advancement device 500 from progressing past a predetermined point along the carrier slide path 310, thereby locating the egg carrier 100 at a consistent injection position. According to some aspects of the present disclosure, the stop may be provided on or proximate to one or both of the side rails 320. In some instances, the stop 325 may include one or more pin stops oriented transversely to a longitudinal direction of the support rails 320. In one aspect, the pin stop may be oriented substantially perpendicular to the longitudinal direction of the support rails 320. The face wall 510 of the pusher block 505 may abut or otherwise interact with the stop 325 to limit further advancement of the pusher block 505 along the guide assembly. In this manner, the operator may be assured that the egg carrier 100 is in the appropriate position for an egg injection event to occur. In some instances, the manual advancement device 500 may include an component or mechanism for facilitating temporary attachment to the egg carrier 100 to ensure that the egg carrier 100 does not move beyond the injection position due to momentum when the manual advancement device 500 engages the stop 325.

Additionally, the use of the manual advancement device 500 provides a safety feature in that the operator does not need to directly handle the egg carrier 100 when moving the egg carrier 100 to the injection position. In this regard, no body part of the operator should move beneath the injection assembly in order to position the egg carrier 100 in the injection position, thereby limiting the likelihood of an accidental needle prick to the operator.

Figure 6:
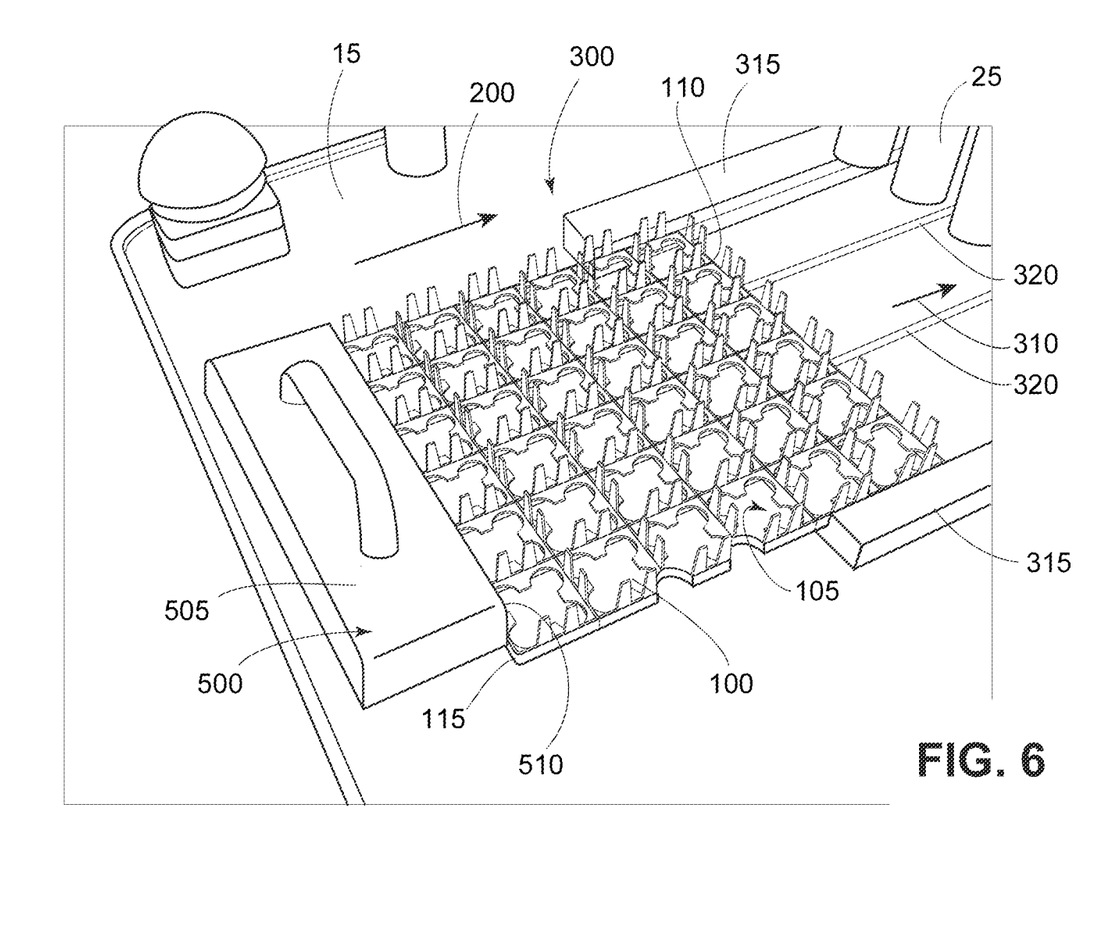
FIG. 6 illustrates a manual advancement device abutting a trailing end of an egg carrier within an advancement system for an in ovo injection apparatus, according to one aspect of the present disclosure.
Figure 7:
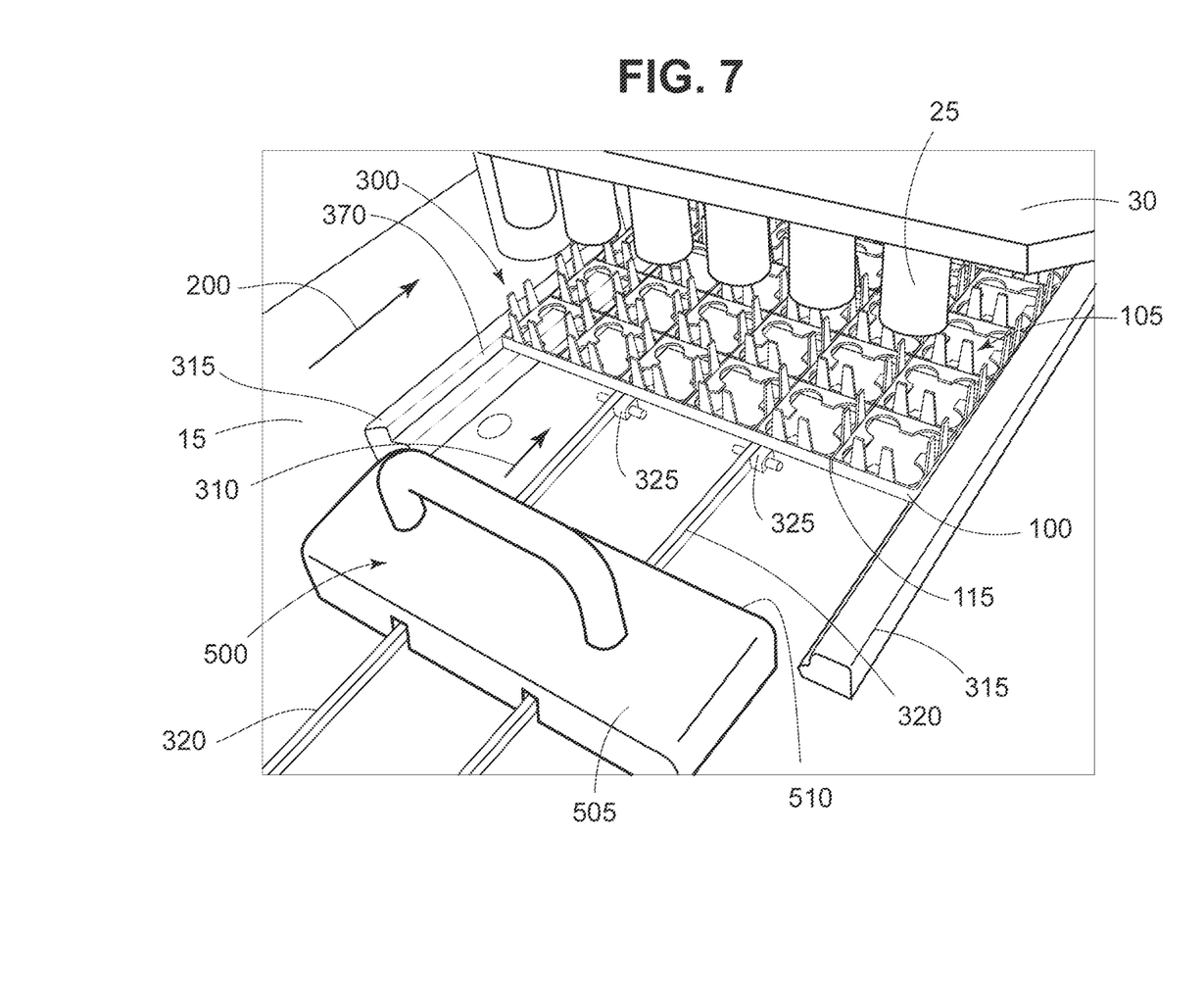
FIG. 7 illustrates a manual advancement device returning to a loading position after an egg carrier is positioned and located at an injection position, according to one aspect of the present disclosure.

In operation, in order to position the egg carrier 100 in the loading position, the manual advancement device 500 may be positioned at the beginning of the guide assembly. The egg carrier 100 may then be loaded into the guide assembly and within the carrier slide path 310 such that the manual advancement device 500 may abut the trailing end 115 of the egg carrier 100, as shown in FIG. 6. The manual advancement device 500 may then be advanced by the operator in the direction toward the injection assembly 20, thereby moving the egg carrier 100 from the loading position toward the injection position. The manual advancement device 500 may then be advanced until interacting with the stop 325, thereby preventing any further advancement of the manual advancement device 500 and thus, also, the egg carrier 100. The egg carrier 100 is then consistently positioned at the injection position for the egg injection event, wherein the manual advancement device 500 may be returned to the beginning of the guide assembly so as to allow a subsequent egg carrier 100 to be loaded within the guide assembly. After the egg injection event, in some instances, a subsequent egg carrier 100 may be loaded into the guide assembly, wherein advancement of the subsequent egg carrier 100 causes the leading end 110 thereof to abut the trailing end 115 of the previously advanced egg carrier 100 (now beneath the injection assembly 20) for advancement thereof from beneath the injection assembly 20 such that the egg carrier 100 with injected eggs may be removed from the in ovo injection apparatus 10. In other instances, the manual advancement device 500 (or a similar device) may be provided with a hook such that the egg carrier 100 may be hooked for removal from beneath the injection assembly such that the operator's body parts are not placed under the injection assembly 20.

Many modifications and other aspects of the present disclosure set forth herein will come to mind to one skilled in the art to which this disclosure pertains having the benefit of the teachings presented in the foregoing descriptions and the associated drawings. Therefore, it is to be understood that the present disclosure is not to be limited to the specific aspects disclosed and that modifications and other aspects are intended to be included within the scope of the appended claims. For example, it will be understood that while the present disclosure refers to injection into the avian eggs, the apparatus 10 may also provide capabilities for extracting of a substance from the eggs. In this manner, the advancement system 300 may operate in the same manner as previously described so as to position the avian eggs for substance extraction. Although specific terms are employed herein, they are used in a generic and descriptive sense only and not for purposes of limitation.

That which is claimed:

1. An in ovo injection apparatus capable of injecting a plurality of avian eggs carried by an egg carrier having a leading end and a trailing end, the apparatus comprising:
    an injection assembly having a plurality of injection devices, each injection device being configured to inject a respective avian egg when aligned therewith; and
    an advancement system configured to advance an egg carrier carrying a plurality of avian eggs to the injection assembly for injection thereof, the advancement system comprising:
        a guide assembly configured to receive the egg carrier and provide support thereto during advancement of the egg carrier;
        a manual advancement device configured to slidingly engage the guide assembly such that the manual advancement device is movable along the guide assembly, the manual advancement device being capable of interacting with the trailing end of the egg carrier to advance the egg carrier to an injection position; and
        at least one stop positioned to interact with the manual advancement device during advancement of the egg carrier along the guide assembly toward the injection assembly so as to prevent progression of the manual advancement device beneath the injection assembly, thereby locating the egg carrier at the injection position.

2. An in ovo injection apparatus according to claim 1, wherein the guide assembly comprises at least one support rail, and the manual advancement device defines a channel configured to receive the at least one support rail such that the manual advancement device is capable of slidably moving along the support rail.

3. An in ovo injection apparatus according to claim 2, wherein the at least one stop is positioned along the at least one support rail.

4. An in ovo injection apparatus according to claim 3, wherein the at least one stop comprises a pin oriented transversely to a longitudinal direction of the at least one support rail.

5. An in ovo injection apparatus according to claim 4, wherein the pin is oriented perpendicular to the longitudinal direction of the at least one support rail.

6. An in ovo injection apparatus according to claim 1, wherein the manual advancement device is comprised of ultra high molecular weight polyethylene.

7. An in ovo injection apparatus according to claim 1, wherein the guide assembly comprises a pair of side rails configured to provide lateral support to the egg carrier during advancement thereof to the injection position, the side rails being arranged in parallel and movable to a plurality of positions to allow various parallel spacing therebetween for accepting eggs carriers of various dimensions.

8. An in ovo injection apparatus according to claim 7, wherein each side rail defines a plurality of cavities, each cavity being capable of receiving a respective post of the guide assembly to provide a fixed spacing between the side rails, the side rails being movable among the cavities in accordance with the posts to alter the spacing therebetween.

9. A method of advancing an egg carrier through an in ovo injection apparatus for injection of a plurality of avian eggs carried by the egg carrier, the method comprising:
    engaging an egg carrier with a guide assembly of an in ovo injection apparatus, the egg carrier having a leading end and a trailing end;
    abutting a manual advancement device against the trailing end of the egg carrier;
    advancing the manual advancement device along the guide assembly toward an injection assembly of the in ovo injection apparatus, thereby advancing the egg carrier along the guide assembly toward an injection position beneath the injection assembly; and
    engaging the manual advancement device with a stop positioned along the guide assembly so as to prevent progression of the manual advancement device beneath the injection assembly, thereby locating the egg carrier at the injection position.

10. A method according to claim 9, wherein engaging an egg carrier with a guide assembly comprises engaging an egg carrier with a guide assembly having at least one support rail, and further wherein advancing the manual advancement device along the guide assembly comprises slidably moving the manual advancement device along the guide assembly by slidably positioning the at least one support rail in a channel defined by the manual advancement device.

11. A method according to claim 10, wherein engaging the manual advancement device with a stop positioned along the guide assembly comprises engaging the manual advancement device with a stop positioned along the at least one support rail.

12. A method according to claim 11, wherein advancing the manual advancement device along the guide assembly comprises advancing the manual advancement device along the guide assembly having a pair of side rails configured to provide lateral support to the egg carrier during advancement thereof to the injection position, the side rails being arranged in parallel and movable to a plurality of positions to allow various parallel spacing therebetween for accepting eggs carriers of various dimensions.

13. A method according to claim 11, further comprising adjusting the parallel spacing between the side rails by positioning one of a plurality of cavities defined by each side rail to receive a respective post of the guide assembly so as to provide a fixed spacing between the side rails capable of receiving the egg carrier.

* * * * *